July 26, 1932. L. S. OKAI 1,868,802
BASIN FLOWER HOLDER
Filed Dec. 30, 1930
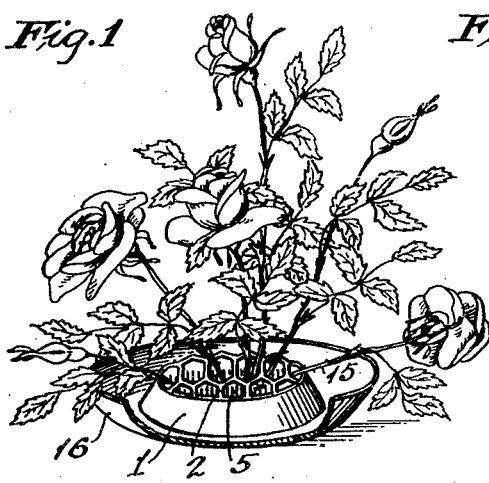
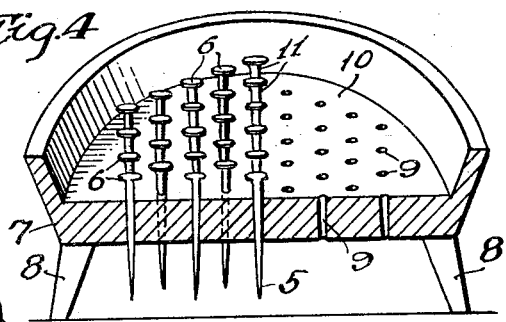
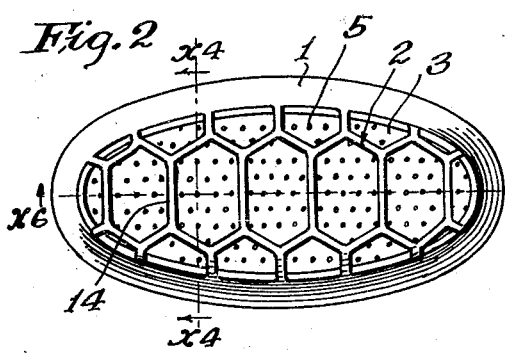
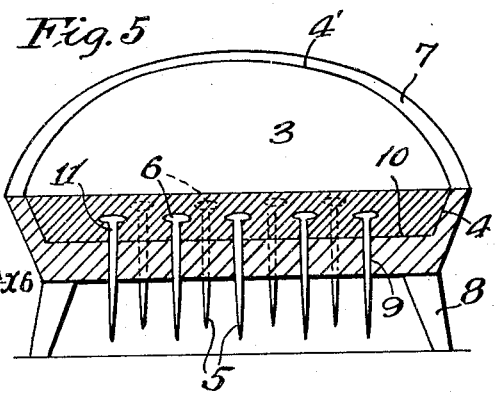
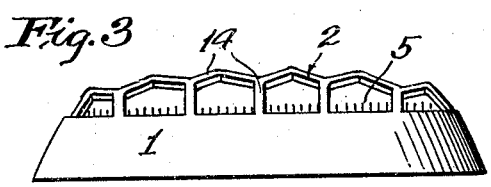
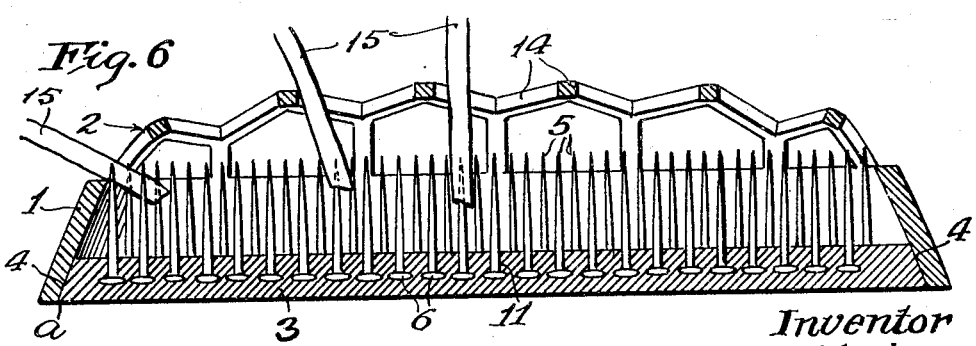
Witness
C. H. Whitmore
Inventor
Luis Soji Okai
by James R. Townsend
his atty

UNITED STATES PATENT OFFICE

LUIS SOJI OKAI, OF LOS ANGELES, CALIFORNIA

BASIN FLOWER HOLDER

Application filed December 30, 1930. Serial No. 505,517.

An object of the invention is accommodation of a bouquet of cut flowers in a bowl of less depth than the flowers.

This invention relates to the provision of means whereby cut flowers may be arranged in a symmetrical bouquet in a basin, the depth of which is less than the length of the stems of the flowers which make up the bouquet.

An object of this invention is to provide a device to enable one to fix various arrangements of cut flowers for the purpose of holding such arrangements in true form when placed in a basin or bowl adapted to supply the stems with water to keep the flowers fresh.

An object is to make it easy for the arranger to place each flower in exactly the position he determines, and, by the use of his fingers alone, to fasten each flower stem in the place and at the angle required to give the intended artistic effect; and to allow him to take out and replace, and to rearrange, and add to the number of such flowers, as his fancy may dictate or suggest.

Another object is to provide a simple and attractive device of this kind which can be easily made at low cost and that will be strong and durable.

The invention is adapted for construction in various forms and will be described herein as made in two pieces fitted together and secured by welding; my invention includes parts and a combination as will hereinafter more fully appear.

In this invention I have provided a weighted plate having flower stem retainers in the form of pins, and I guard the points of the pins with lattice work having openings through which the user can put his fingers to arrange the cut flower stems with respect to the flower holder and pins.

An object is to make provision for holding the stems firmly and yet allow the flowers to be easily removed one at a time, without disarrangement of the others.

Another object is to make provision whereby tall bouquets may be displayed in shallow basins or bowls with no likelihood of upsetting the bouquet or the shallow bowl.

The walls of the band are aslant upwardly at an acute angle to the base so that the lines of direction from the pin points and from the rim of the band, and from the lacings of the lattice crown, fall well within the base of the weight plate.

Another object is to make provision whereby cut flowers having thick stems and heavy heads, such as hollyhocks, branch stems of rose bushes and the like, can be displayed in shallow basins of water without inconvenience and danger of upsetting.

Other objects, advantages and features of invention may appear from the accompanying drawing, the subjoined detailed description and the appended claims.

The accompanying drawing illustrates the invention.

Figure 1 is a perspective view on a diminutive scale of a form of cut flower holder in use in a bowl of water with a number of cut flowers in place; the bowl wall being partly broken away for clearness of illustration.

Fig. 2 is a top view on a larger scale than Fig. 1, of the holder alone.

Fig. 3 is a side elevation of the holder shown in Fig. 2.

Fig. 4 is a transverse section of the weight plate mold with some of the retainers in position where they are set for having their heads embedded when the metal for the plate has been poured.

Fig. 5 is a transverse section of the mold and molded plate ready for removal from the mold; said pin butts and heads being fully invested in the plate.

Fig. 6 is a vertical longitudinal mid-section of the holder completed and ready to receive cut flowers, fragments of a few stems of which are shown in place.

The holder frame consists in a downwardly flaring band 1 and a lattice crown 2, and is formed as a single piece which may be cast inverted in a mold, not shown, and in a manner common to the molder's art.

The band 1 may be of circular, elliptical, or other plan or horizontal sectional form, and its walls are aslant upwardly from bottom to top, and a base plate 3 is fitted in the bottom thereof.

The base plate or weight 3 has an upwardly reduced perimeter 4 adapted to fit into the flaring band, and is provided with retainers 5 extending upwardy therefrom end provided with thicker portions or heads 6 which are embedded in the plate.

The weighty base plate 3 is secured in the band 1 by any suitable means, as by welding at *a* fixing the bottom of the band to the lower edge of the weight.

In order to provide the weight with its pins 5, a mold cup 7 which may be of cast iron is provided with supporting means as the legs 8 and with vertical pin holding orifices 9, formed in the floor 10, and of less diameter than the butts 11 of the pins near their heads, so that when the pins are inserted down through the orifices their heads 6 and a portion of their bodies, respectively, will extend up into the cavity of the mold.

In Fig. 4, the mold comprises a cast iron cup 7 mounted on supports as the legs 8, and has a flat floor 10 through which are provided orifices 9 adapted to seat the pins, and of less diameter than the butts 11 so that the pins are stopped and supported thereby when the butts 11 or thicker portions protrude with their heads 6 out of contact with the mold floor, so that when the molten meal is poured into the cup of the mold it will envelope the butts and heads of the pins.

When the poured metal has set in the mold, the mold will be inverted and the weight plate with butts and heads inserted therein will be dislodged from the mold and is then ready to be inserted into the band and secured by welding to the lower edge of the band as at *a*.

The lacings 14 of the lattice are sufficiently open to allow the attendant to insert his fingers therethrough to place the stems 15 of the cut flowers where required, and to force the same on to the sharp points of the retainers so that such retainers will hold the stems in place.

The basin or bowl 16 with which the holder is to be used will be shallow so that there will be a necessity of supporting upright flower stems by sticking the ends of the stems straight down on the points of the pins. Other stems may be laid down on the rim of the bowl, and others may be laid down on the lacing of the lattice and the pins stuck through the sides of the stems.

I claim:—

1. A cut flower holder comprising a weighted base plate; pins having butts provided with heads; said heads and butts being embedded in the plate, and the bodies of the pins extending above the plate for engagement with cut flower stem; and a frame consisting of a band and a lattice crown on top of the band for receiving and supporting cut flower stems and allowing such stems to be stuck onto the pins.

2. In a cut flower holder, a lattice crown and a flaring band supporting the same for the purpose of guarding and enclosing an assembly of pins for holding the stems of cut flowers; and a plate provided with pins, and fixed to the band with the pins extending up inside the band and into the crown.

3. A cut flower holder provided with a weight plate; pins fixed to, and projecting upward from the weight plate, a band fixed to the bottom edge of the weight plate and extending upward inwardly acutely aslant around the pins, and a lattice crown fixed to the top rim of the band, so that the rim and the lattice work form flower stem supports, the lines of direction from which fall with the rim of the base plate.

4. A cut flower holder provided with a weight plate; pins fixed to, and projecting upward from the weight plate, a band fixed to the bottom edge of the weight plate and extending upward inwardly acutely aslant around the pins, and a lattice crown integral with the top rim of the band, so that the rim and the lattice work form flower stem supports, the lines of direction from which fall with the rim of the base plate.

In testimony whereof, I have hereunto set my hand at Los Angeles, California, this 15th day of December, 1930.

LUIS SOJI OKAI.